Nov. 5, 1957   H. S. DE YOUNG   2,812,107
CONTROL VALVE
Original Filed Jan. 30, 1956
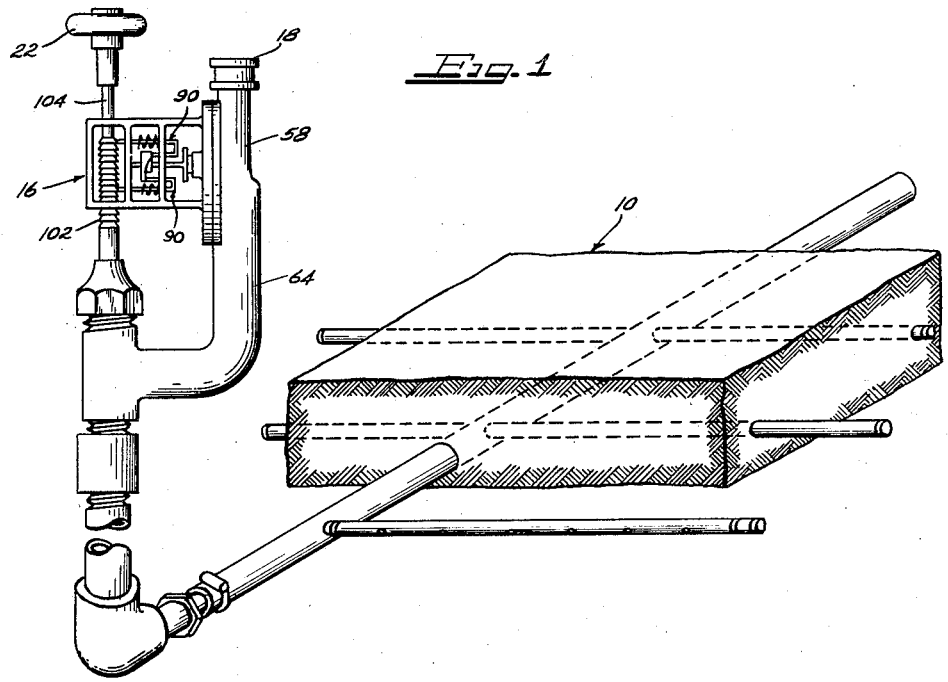
Fig. 1
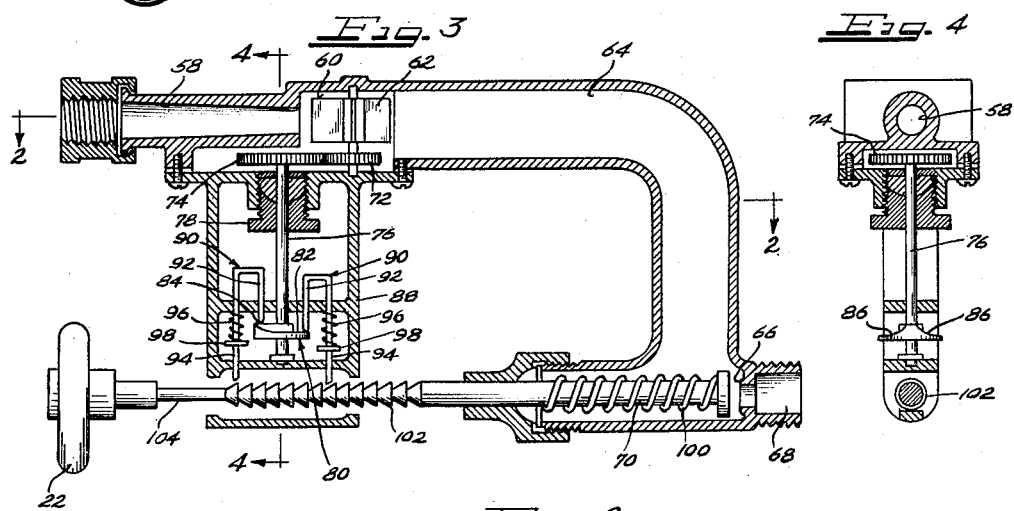
Fig. 3
Fig. 4
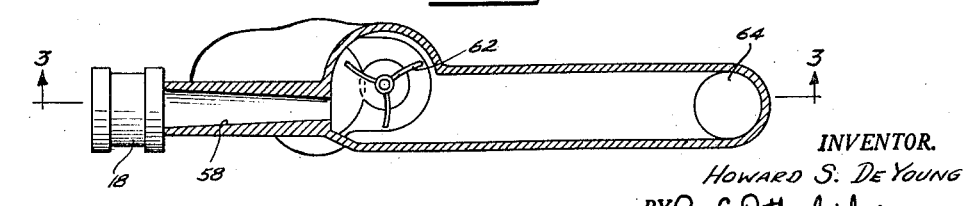
Fig. 2
INVENTOR.
HOWARD S. DE YOUNG
BY Roy E. Petherbridge

United States Patent Office 2,812,107
Patented Nov. 5, 1957

2,812,107

CONTROL VALVE

Howard S. De Young, Chicago, Ill.

Original application January 30, 1956, Serial No. 562,108. Divided and this application April 24, 1956, Serial No. 580,399

5 Claims. (Cl. 222—20)

This invention relates to fluid valves that automatically close after a selected amount of fluid has been delivered through the valve. This application is a division of my earlier filed co-pending application, Serial No. 562,108, filed January 30, 1956.

An object of the invention is to provide a control valve that automatically closes after an adjustable predetermined amount of fluid has passed through the valve.

A further object is to provide a fluid valve for cutting off the flow of fluid after a predetermined quantity of fluid has been passed wherein the force due to fluid flow is utilized to move the valve to a closed position.

A still further object is the provision of an automatic shut-off valve for delivering a selected amount of fluid which is simple and economical in construction and yet positive in operation.

These and other objects and advantages will become readily apparent as the description proceeds and is read in conjunction with the accompanying drawings, in which—

Fig. 1 shows the general construction and arrangement of my novel control valve.

Fig. 2 is a plan sectional view of the control valve taken on line 2—2 of Fig. 3.

Fig. 3 is a sectional view taken generally on line 3—3 of Fig. 2; and

Fig. 4 is a sectional view of the control valve taken on line 4—4 of Fig. 3.

It should be understood that the attached drawings and this specification describe a preferred embodiment of my invention as required by law but that various changes and modifications can be made therein without departing from the scope of the invention.

Referring to Fig. 1 of the drawings, the flow control valve is indicated at 16 and is arranged to have a supply pipe or hose connected to inlet fitting 18. For sake of illustration only, valve 16 is shown connected to a subsurface watering system, generally indicated at 10.

Control valve 16 is a metering or timing valve which measures the amount of water flowing therethrough and automatically shuts off after a pre-selected amount of water has been delivered. In operation, handle 22 of the valve is adjusted to a position representative of the required amount of water. After the selected amount of water has been delivered, valve 16 automatically closes until handle 22 is reset.

Connector 18, which is adapted to be connected to a supply line or hose, communicates with a venturi 58 that discharges into a chamber 60 in which is rotatably mounted an impeller 62. Water will flow from venturi 58, past impeller 62 and through conduit 64, past valve seat 66, into discharge nipple 68, whenever valve stem 70 is open. Since impeller 62 is free to rotate, the amount of its rotation will be determined by the volume of water passing the impeller.

A gear 72 is fixedly secured to the shaft of impeller 62 so as to rotate therewith. Gear 72 meshes with driven gear 74 which is supported for rotation with shaft 76 by a sealing fitting 78. Shaft 76 at its lower end carries cam 80 which has a low side 82 and a high side 84 joined by smooth inclined surfaces 86. (Figs. 5 and 6.) A frame 88 supports the lower end of shaft 76.

Mounted in frame 88 on opposite sides of shaft 76 are U-shaped fingers 90 which have short legs 92 positioned against cam 80, and which have long sides 94 depending through frame 88. Fingers 90 fit loosely in frame 88 so that they can be raised and lowered by cam 80 as the cam rotates. In order to hold short legs 92 against the surface of cam 80, springs 96 are provided which are placed under compression between frame 88 and shoulders 98 carried by fingers 90.

Valve stem 70 extends away from valve seat 66 and passes beneath fingers 90, terminating in handle 22. The valve stem is normally urged toward its closed position by spring 100 and held out of its closed position by engagement of one of the U-shaped fingers 90 with machined shoulders, generally indicated at 102 on the valve stem. Stem 70 is machined so as to provide a series of conically shaped surfaces between the straight shoulders. The lower ends of the long sides 94 of fingers 90 are cut away to fit flush with the conical surfaces.

In operating valve 16, assuming that the valve is closed, handle 22 is pulled to the left as viewed in Fig. 5 against the force of spring 100 to open the valve. As the valve stem moves to the left, fingers 90 will not interfere with this movement since they will ride up and down over the shoulders and conically shaped sections of the valve stem. The distance the valve stem is moved to the left will determine how much water will be delivered by the valve before it closes.

When handle 22 is released, the shoulders on the valve stem will be immediately engaged by whichever of the fingers 90 then has its short leg 92 bearing against the low side 82 of cam 80.

As water flows past impeller 62, the impeller will be rotated to rotate cam 80 through reduction gears 72 and 74. Assuming, as shown in the drawings, that right hand finger 90 engages the low side 82 of cam 80 and the left hand finger 90 engages the high side of the cam so that only the right hand finger engages a shoulder on valve stem 70, as cam 80 rotates the right hand finger 90 is gradually moved out of engagement with a shoulder on the valve stem and the left hand finger gradually moves downwardly toward the valve stem. The positioning of fingers 90 and the shoulders on the valve stem are such that the left hand finger will move against one of the conical surfaces when the right hand finger engages the shoulder. Thus when cam 80 has rotated sufficiently to disengage from a shoulder on the valve stem, the valve stem will move to the right under the force of spring 100 a distance sufficient to engage the left hand finger with a shoulder on the valve stem. In this position, the right hand finger will be bearing against the high side of the cam while the left hand finger bears against the low side of the cam and holds the valve stem against further movement. When the cam rotates another 180° the left hand finger will release allowing the valve stem to advance to the right, whereupon the right hand finger will again engage the valve stem. Thus as water passes through the valve, the valve stem will be gradually stepped toward its closed position. When the valve stem has finally reached a position where left hand finger 90 is disposed over reduced portion 104 of the valve stem, the valve will then snap closed.

I claim:

1. In a control valve having valve seat means, a valve stem connected to said valve seat means and removable in a direction to open and close said valve seat means, an impeller rotated by the passage of fluid through said valve, a cam driven by said impeller, machined portions on said valve stem, fingers engaging said cam and machined portion on said valve stem, resilient means urging said stem in a direction to close said valve seat means, handle means on said stem for moving said stem against the force of said resilient means to open said valve seat means a selected amount, said fingers engaging said machined portions to hold said valve seat means open and allowing said stem to move said valve seat means toward a closed position as said impeller is rotated by the passage of fluid past said impeller.

2. In a control valve having valve seat means, a valve stem connected to said valve seat means, an impeller, a rotatable cam driven from said impeller, machine portions on said valve stem comprising alternate shoulders and reduced portions, fingers adapted to engage said cam and adapted to engage said shoulders on said valve stem, said fingers alternately engaging separate shoulders on said valve stem as said impeller is rotated to permit said valve stem to move toward its closed position as fluid flows through said control valve.

3. A control valve as provided in claim 2, wherein handle means are provided on said stem operable to move said valve seat to a pre-selected open position and said fingers permit said stem to move freely in a direction to open said valve seat means.

4. A control valve as provided in claim 2, wherein handle means are provided on said stem operable to move said valve seat to a pre-selected open position and said fingers permit said stem to move freely in a direction to open said valve seat means, and resilient means urging said stem in a direction to close said valve seat means.

5. In a control valve having valve seat means, a valve stem connected to said valve seat means, an impeller, a rotatable cam driven from said impeller, machined portions on said valve stem comprising alternate shoulders and reduced portions, a pair of U-shaped fingers arranged on opposite sides of said cam, spring means to urge said fingers into engagement with the surface of said cam, said fingers and shoulder portions on said valve stem being positioned so that the U-shaped fingers alternately engage separate shoulders on said valve stem, and spring means urge said valve stem toward its closed position, whereby said valve stem is moved toward its closed position in step by step movement when said cam is rotated by the passage of fluid through said valve.

References Cited in the file of this patent
UNITED STATES PATENTS

| | | |
|---|---|---|
| 1,049,288 | Bertram | Dec. 31, 1912 |
| 1,177,529 | Marguardt | Mar. 28, 1916 |
| 1,809,440 | Elder | June 9, 1931 |
| 2,432,923 | Newman | Dec. 16, 1947 |